July 3, 1934.  M. J. LEWIS  1,964,885

TEST BLOCK

Filed Sept. 15, 1931

INVENTOR
BY Morgan J. Lewis
Frease and Bishop ATTORNEYS

Patented July 3, 1934

1,964,885

UNITED STATES PATENT OFFICE 1,964,885

TEST BLOCK

Morgan J. Lewis, Massillon, Ohio, assignor, by mesne assignments, to The States Company, Hartford, Conn., a corporation of Connecticut Application September 15, 1931, Serial No. 562,854

1 Claim. (Cl. 175—183)

The invention relates to test blocks for use in connection with electric meters and more particularly to a block of this character adapted to be permanently mounted adjacent to the meter and adapted to normally connect the line and load wires to the meter, and provided with means for directly connecting the line and load wires and cutting out the meter in order to test the same.

The test blocks now in common use are provided with removable links whereby the circuit through the meter may be broken for the purpose of testing the meter, either these links or jumpers of some sort being used to connect the line and load wires in order that the consumer may continue to draw current from the lines while the meter is being tested.

With the use of such test blocks it is necessary that several links be removed, certain of these links being replaced in the testing position in order that the consumer may have current while the meter is being tested. When the meter has been tested the links may then be replaced in the service position. This frequently results in disturbing the consumer's current when the change is made from the service to the testing position or vice versa.

The object of the present improvement is to provide a test block having no removable parts whereby the same may be changed from the service position to the testing position without disturbing the consumer's current.

The above and other objects may be attained by providing slidable members, which may be in the form of screws or bolts, adapted to be slidably moved from the service position to the testing position in order to place the parts in position to test the meter without at any time disturbing the consumer's current.

Figure 1:
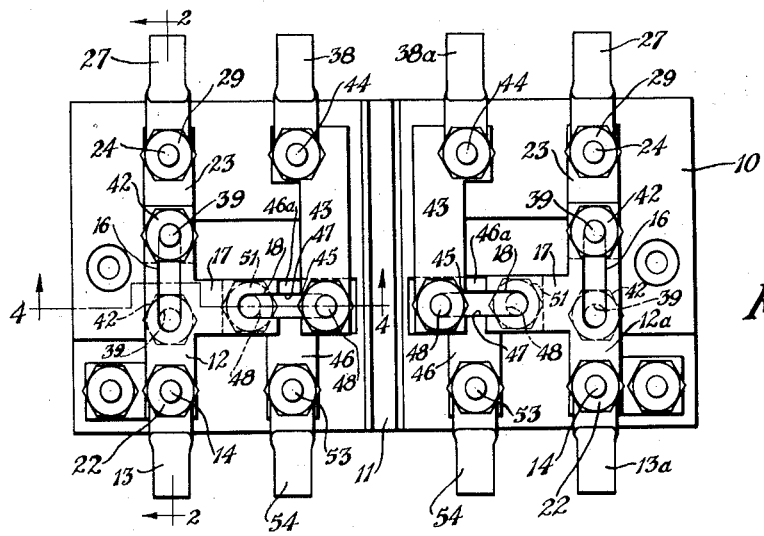
Figures 2, 3:
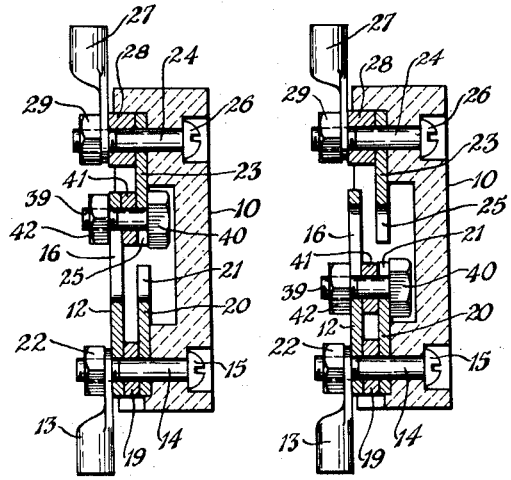
Figure 4:
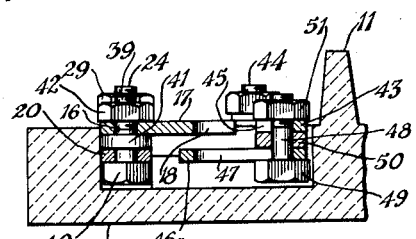
Figure 5:
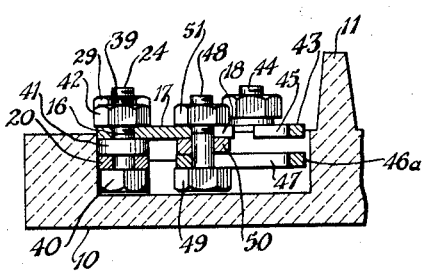

The above and other objects may be attained by constructing the improved test block in the manner illustrated in the accompanying drawing, in which Figure 1 is a front elevation of a test block embodying the invention showing the same in the service position;

Fig. 2, a section taken on the line 2—2, Fig. 1;

Fig. 3, a section similar to Fig. 2 showing the same in the testing position;

Fig. 4, a section on the line 4—4, Fig. 1;

Fig. 5, a view similar to Fig. 4 showing the same in the testing position; and

Figure 6:
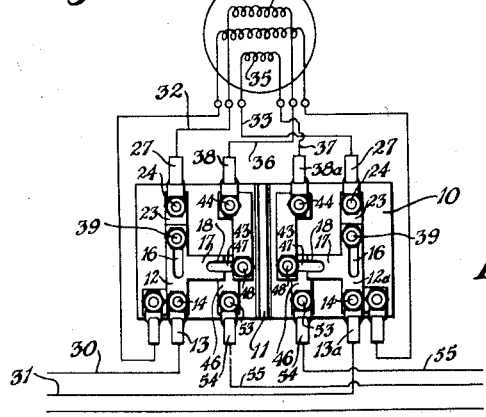

Fig. 6, a diagrammatic view showing the application of the test block to a meter.

Similar numerals refer to similar parts throughout the drawing.

The parts may be mounted upon a base or block 10 formed of suitable insulation material preferably provided with the upwardly or outwardly projecting barrier wall 11 formed of the same material. The apparatus upon each side of the barrier 11 may be the same excepting that, as shown in Figs. 1 and 6, the positions of the parts on opposite sides of the barrier may be reversed.

The conductor bars or fingers 12 and 12a are mounted upon opposite sides of the barrier 11 and near the outer end portions of the insulation block 10, being secured thereto, and electrically connected to the terminal lugs 13 and 13a respectively, as by the bindings posts or bolts 14, located through the blocks and preferably having their heads 15 countersunk in the rear face of the block. Each of the bars 12 and 12a is provided with a vertical slot 16 and with an angular offset portion or finger 17 extending toward the barrier wall 11 and having an open slot 18 in its end portion.

Located beneath each bar 12 and 12a, and preferably spaced therefrom as by a washer 19 is a shorter bar 20 provided in its upper end with an open slot 21 registering with the lower portion of the slot 16. A binding nut 22 may be provided upon the threaded end of each binding post 14 in order to hold the above described parts in position thereon.

Conductor bars 23, similar to the bars or fingers 20 and in alinement therewith, are connected to the upper portion of the base 10 as by the binding posts or bolts 24, each of said bars 23 having an open slot 25 in its lower end. The heads 26 of the bolts 24 may be countersunk within the rear face of the insulation block and the terminal lugs 27 may be mounted upon said bolts, being spaced therefrom as by the washers 28 and held in position upon the bolts as by the nuts 29 located upon the outer screw threaded ends of the bolts.

The line wires 30 and 31 may be connected to the terminal lugs 13 and 13a respectively and the respective terminal lugs 27 may be connected by the wires 32 and 33 with the meter coils 34 and 35 respectively. Wires 36 and 37 are connected to the other sides of the meter coils and lead to the terminal lugs 38 and 38a respectively, located on opposite sides of the barrier 11.

A slidably adjustable bolt 39 is located through the slot 16 of each bar 12 and normally engaged in the slot 25 of the corresponding bar 23, as shown in full lines in Figs. 1, 2 and 6. The head 40 of said bolt is adapted to contact with the rear or under side of the bar 23 and a washer 41 is provided upon the bolt between the bars 12 and 23, a nut 42 being provided upon the outer screw threaded end of the bolt to hold the same in adjusted position. By loosening the nut 42 the bolt 39 may be slidably moved downward in the slot 16 of the bar 12, out of engagement with the slot 25 of the bar 23 and into the slot 21 of the corresponding bar 20, thus disconnecting the bars 12 and 23.

Conductor bars or fingers 43 are mounted on the block 10 upon opposite sides of the barrier 11, being electrically connected to the terminal lugs 38 and 38a as by the screws or bolts 44, the lower portion of each of said bars having a horizontally disposed open slot 45 through its outer edge, that is, on the side away from the barrier 11. This slot 45 is in alinement with the open slot 18 in the end of the angular portion 17 of the corresponding bar 12 and is spaced therefrom as shown on the drawings.

A T-shaped bar or finger 46 is mounted upon the lower portion of the block 10 on each side of the barrier 11, the head 46a thereof having a horizontal slot 47 therein registering with the corresponding open slots 18 and 45.

A slidably adjustable bolt 48 is located through each slot 47, the head 49 of the bolt contacting with the rear or under side of the bar portion 46a, said bolt having a washer 50 thereon normally located between said head 46a and the bar 43, the bolt being normally located through the open slot 45 in said bar and provided with a nut 51 for holding the bolt in this position, as shown in full lines in Figs. 1, 4 and 6.

By loosening the nut 51 the bolt 48 may be slidably moved through the slot 47, out of the slot 43 and into the slot 18 as shown in Fig. 5, at which time the nut 51 may be tightened to hold the bolt in this position with the washer 50 located between the T-head 46a and the angular projection 17.

Each of the T-bars 46 has connected to its lower end, as by a screw or bolt 53, a terminal lug 54 to which the load wires 55 may be connected. With the parts in the service position as shown in full lines in Fig. 1 and in Figs. 2, 4 and 6, the current from the line wire 30 and 31 passes through the test block to the meter and then back through the test block to the load wires 55.

When it is desired to test the meter, the nuts 51 are loosened and the bolts 48 are slidably moved, through the slots 47, out of the open slots 45 and into the open slots 18, thus disconnecting the T-bars 46 from the conductor bars 43 and electrically connecting said T-bars with the angular projections 17 of the conductor bars 12 and 12a, the nuts 51 being then tightened to hold the bolts 48 in this position.

It will be seen that the space between each conductor bar 43 and the adjacent angular projection 17 is considerably less than the diameter of either the washer 50 or the washer or the nut 51 so that the nut will contact with one of these fingers before being moved out of contact with the other, thus permitting the change to be made without at any time disturbing the consumer's current.

With the bolts 48 moved into the position shown in dotted lines in Figs. 1 and in full lines in Fig. 5, the current from each of the line wires passes from the corresponding terminal lug 13 or 13a through the bar 12 or 12a and its angular extension 17 to the corresponding T-bar 46 and then through the wire terminals 54 to the respective line wires 55.

By loosening each of the nuts 42, the bolts 49 may be slidably moved from the full line position shown in Figs. 1, 2 and 6 to the position shown in dotted lines in Fig. 1 and in full lines in Fig. 3, disconnecting the conductor bars 23 from the bars 12 and 12a, entirely cutting out the meter from the circuit so that the meter may be tested while the current passes uninterrupted from the line wires to the load wires.

When the meter has been tested the bolts 39 and 48 may be moved back to the service position without interrupting the current to the consumer.

Although the invention has been illustrated and described purely as a test block, it should be understood that the usual switch may be mounted upon the insulation block 10 in usual and ordinary manner without in any way changing the invention.

I claim:

An electrical connection block comprising a base, a pair of conducting fingers extending parallel with the upper face of the base and secured thereto at different levels with a section of one overlapping but spaced from a section of the other, the upper of said fingers having a longitudinally extending slot and a transversely extending section, a washer movable longitudinally along the upper slotted finger into and out of the space between said fingers, a bolt and nut for clamping said washer in and out of said space, a pair of conducting fingers extending parallel with the upper face of the base and secured thereto at different levels with a section of one overlapping but spaced from a section of the other, the lower of said fingers having a transversely extending slot and a transversely extending section, a washer movable transversely along the lower slotted finger into and out of the space between the transverse section of the first mentioned upper finger and transverse section of the last mentioned lower finger, and a bolt and nut for clamping said washer in and out of said space.

MORGAN J. LEWIS.